United States Patent [19]
Goldsmith

[11] Patent Number: 5,165,451
[45] Date of Patent: Nov. 24, 1992

[54] VALVE CONTROL SYSTEM FOR HIGH PRESSURE FLUID SYSTEM

[75] Inventor: Peter J. Goldsmith, Houston, Tex.

[73] Assignee: Control Rain Systems, Inc., Houston, Tex.

[21] Appl. No.: 791,117

[22] Filed: Nov. 12, 1991

[51] Int. Cl.⁵ .............................................. B05B 1/14
[52] U.S. Cl. .................. 137/882; 137/454.2; 239/124
[58] Field of Search ............... 137/882, 454.2; 251/322, 152; 239/124

[56] References Cited

U.S. PATENT DOCUMENTS

| | | | |
|---|---|---|---|
| 2,628,062 | 2/1953 | Weber | 251/322 |
| 2,692,114 | 10/1954 | Fullwood | 251/322 X |
| 4,602,740 | 7/1986 | Stachowiak | 137/822 X |
| 4,699,170 | 10/1987 | Diephius et al. | 137/454.6 |
| 4,773,442 | 9/1988 | Lephilibert | 137/454.6 X |

Primary Examiner—John C. Fox
Attorney, Agent, or Firm—Robert W. B. Dickerson

[57] ABSTRACT

A valve control mechanism for regulating fluid flow in a high pressure system, the control mechanism including a cylindrical valve slidable within a sleeve, and a separate valve seat axially aligned with the valve, one embodiment including interlocks between an associated dump tube and the seat, and between the seat and the sleeve.

9 Claims, 5 Drawing Sheets

FIG. 6

VALVE CONTROL SYSTEM FOR HIGH PRESSURE FLUID SYSTEM

BACKGROUND OF THE INVENTION

High pressure fluid apparatus has long been used for cleaning surfaces. Typically, the apparatus includes a housing permitting fluid communication between a fluid source and a high pressure outlet. Further, an alternate fluid communication route is provided between said fluid source and a lower pressure fluid dump, or exhaust. A trigger operated valve mechanism governs the fluid route. Known references are U.S. Pat. Nos. 4349154, 4136854, 4017576, 3986523, 3885739, 3698422, 3679332, 3672575, 3614060, 3181474, 2308347, and 4602740. These valve mechanisms usually have included a valve, a valve guide and a valve seat. Earlier mechanisms sometimes used the walls of the housing as the valve guide. One problem with that arrangement was the difficulty and expense of repair. A more recent development was the provision of a removable cartridge containing the valve, and a unified valve guide and valve seat. Even here, the expense of replacing and repair of the common guide and seat was substantial. Further, machining costs of fabrication were high. Additionally, removal of the valve mechanism from the housing sometimes proved difficult. Applicant's invention is directed to the two-fold problem.

SUMMARY OF THE INVENTION

A gun housing has a passageway linking a high pressure fluid inlet and outlet. Said passageway may also be linked with a low pressure outlet if the valve of a valve mechanism is unseated. The said valve mechanism includes separate guide and seat devices. In one embodiment, a dump tube, associated with the low pressure outlet, and the valve seat, as well as said valve seat and the valve guide, have removably interlocking connections. This arrangement allows decreased manufacturing costs, decreased repair costs, and ease of removal of the valve mechanism from the gun housing.

DESCRIPTION OF THE INVENTION

The primary purposes of this invention are to 1] reduce fabrication costs, 2] reduce repair costs, and 3] expedite removal of the valve mechanism.

Figure 1:
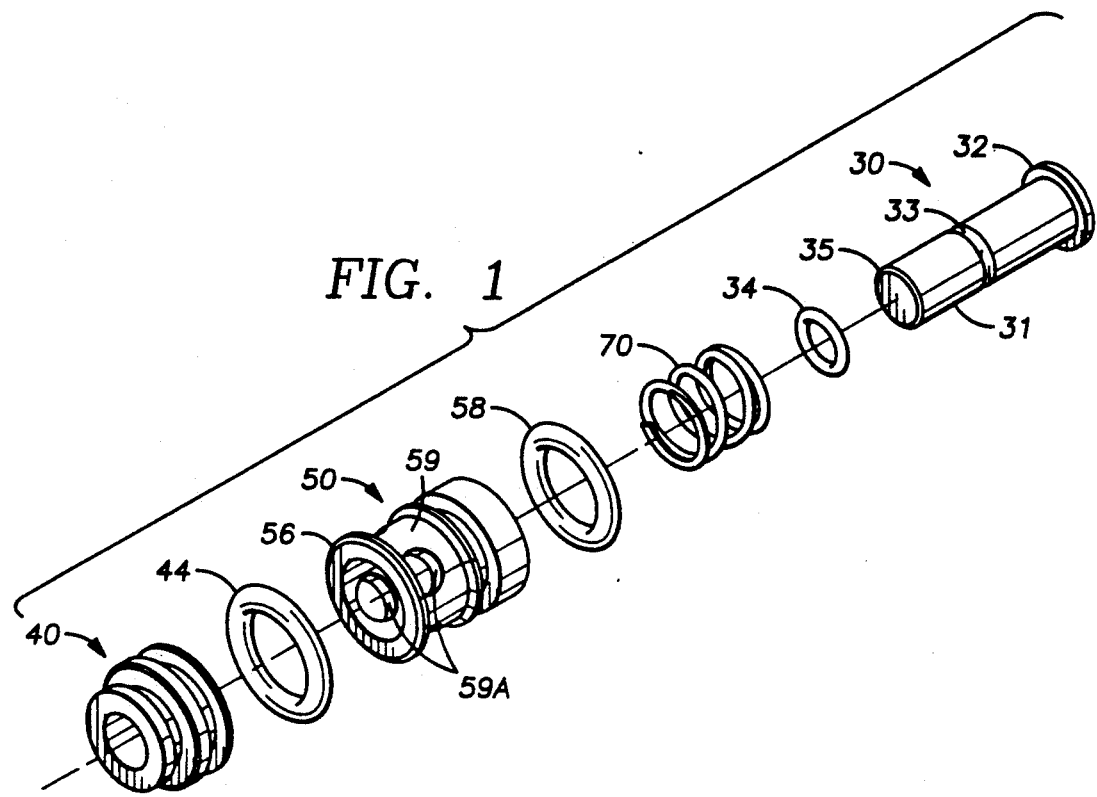
FIG. 1 is an exploded perspective of one embodiment of the valve mechanism.
Figure 2:
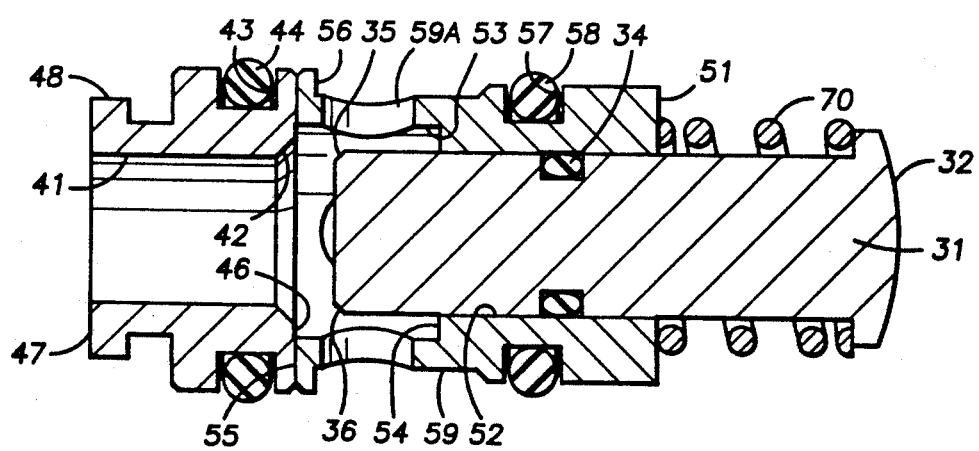
FIG. 2 is an axial section through the assembled parts shown in FIG. 1.
Figure 3:
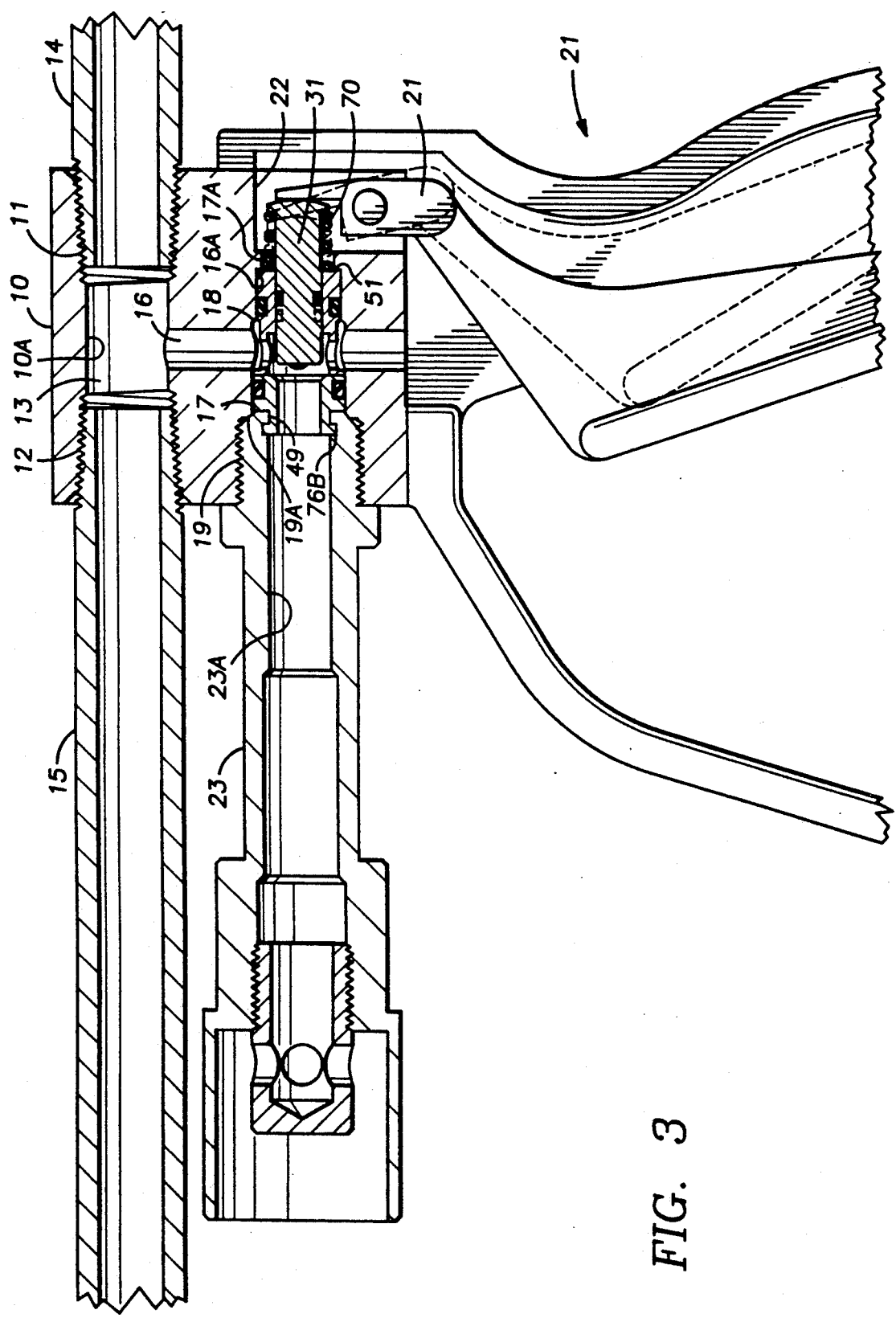
FIG. 3 is a partial vertical section of the assembled gun and valve mechanism of FIG. 1, with the trigger, when not activated, being shown in solid lines, and with the trigger, when activated, being shown in phantom lines.

Look first at the embodiment of FIGS. 1-3. The high pressure gun normally includes housing or body 10. This housing includes a first bore 10A extending axially therethrough, said bore being threaded at each end 11, and 12, and having a central unthreaded flow passageway 13, intermediate portions 11 and 12. These threaded ends comprise a high pressure inlet and outlet, respectively. Inlet tube 14 serves as a connector to a fluid source, while tube 15 serves as the barrel for high pressure fluid emitted. A connector passageway 16 links flow passageway 13 with control passageway 18 provided centrally of a second bore 17, laterally spaced from said first bore 10A. This last mentioned bore 17 is enlarged and threaded at one end 19 to receive a dump or exhaust tube 23. Shoulder 19A links passageway 18 with enlarged bore end 19. The housing end opposite threaded bore end 19, is cut away, as at 22, to receive the activating lever 21 of a trigger mechanism generally identified by the numeral 20. Said cut away 22 communicates with bore 17 via counter bore 17A, and shoulder 16A links members 17 and 17A. To this point, the gun described is well know in the art.

The first embodiment of the control mechanism of this invention includes valve 30, valve sleeve or guide 50, and valve seat 40. The assembled control mechanism is inserted in control passageway 18, to regulate fluid flow through dump or exhaust 23, thereby permitting or circumventing high pressure fluid flow through outlet 12 and tube 15, respectively.

Valve 30 includes cylindrical stem 31 depending from enlarged diameter head 32. Circumscribing stem 31, approximately midway of its length, is an annular groove 33, to accommodate seal 34. The stem end, opposite head 32, is annularly beveled at about 45° relative to its axis, as at 35, leaving a relatively sharp annular peak 36 at the juncture of the beveled surface and the outer stem surface.

The valve seat 40 includes a smooth axial bore 41, and at one seat end 46, the wall of said bore has a beveled seating surface 42 at about 44° relative to its axis. The precise angles of surfaces 42 and 35 are not critical. What is important is that they differ so that an annular line seal occurs when they contact. The outer wall of said valve seat includes annular seal recess 43 for receiving o-ring seal 44. The other end 47 of said seat includes an annular flange 48 for releasable linkage to lip 49 of dump tube 23. Either of said flange or lip may be hemicylindrical in configuration for ease of engagement.

Valve guide 50 includes a smooth axial bore 52 from one end 51 to communicating, enlarged, axial counter bore 53. Said bore and counter bore are joined by shoulder 54. At this time, note that the wall of said bore 52 is swept by valve seal 34 as it reciprocates therein. The other end 55 of guide 50 includes annular flange 56. Near guide end 51, is annular groove 57, which receives seal 58. Intermediate groove 57 and flange 56, the outer wall of guide 50 is slightly dished or reduced in diameter, forming a skirt 59. The wall of said skirt includes a plurality of apertures or fluid passageways 59A therethrough. Finally, compression spring 70 is coiled about valve stem 31, and seated against valve head 32 and valve guide end 51.

Consider now the operation of this embodiment. Tubes 14 and 15 are engaged with threaded ends 11 and 12, respectively the former tube being linked to a source of fluid.

Valve guide 50 is inserted within housing bore 17 through threaded bore end 19, with guide end 51 pressed against shoulder 16A. Valve stem 31 can then be partially inserted within guide bore 52. Spring 70, seated against valve head 32 and guide end 51, biases the valve toward disengagement with valve seating surface 42. The valve seat 40 would be releasably secured to dump tube lug 49. The threaded end of said dump tube, with valve seat attached, would then be inserted within threaded bore end 19, with valve seat end 46 abutting guide end 55. In the absence of trigger activation, fluid entering tube 14 from the fluid source would pass into flow passageway 13, through connector passageway 16, through the annulus surrounding skirt 59, through guide skirt apertures 59A, through seat bore 41 and through the axial bore 23A of dump tube 23, to exhaust. On activation of the trigger mechanism, its activating lever 21 presses against valve head 32, compressing spring 70, and moves valve end 35 into sealing engagement with seating surface 42, thereby blocking fluid flow through dump tube 23. Thus the activating fluid moves from inlet tube 14, through flow passageway 13, and continuing out barrel 15 to perform its function.

Figure 4:
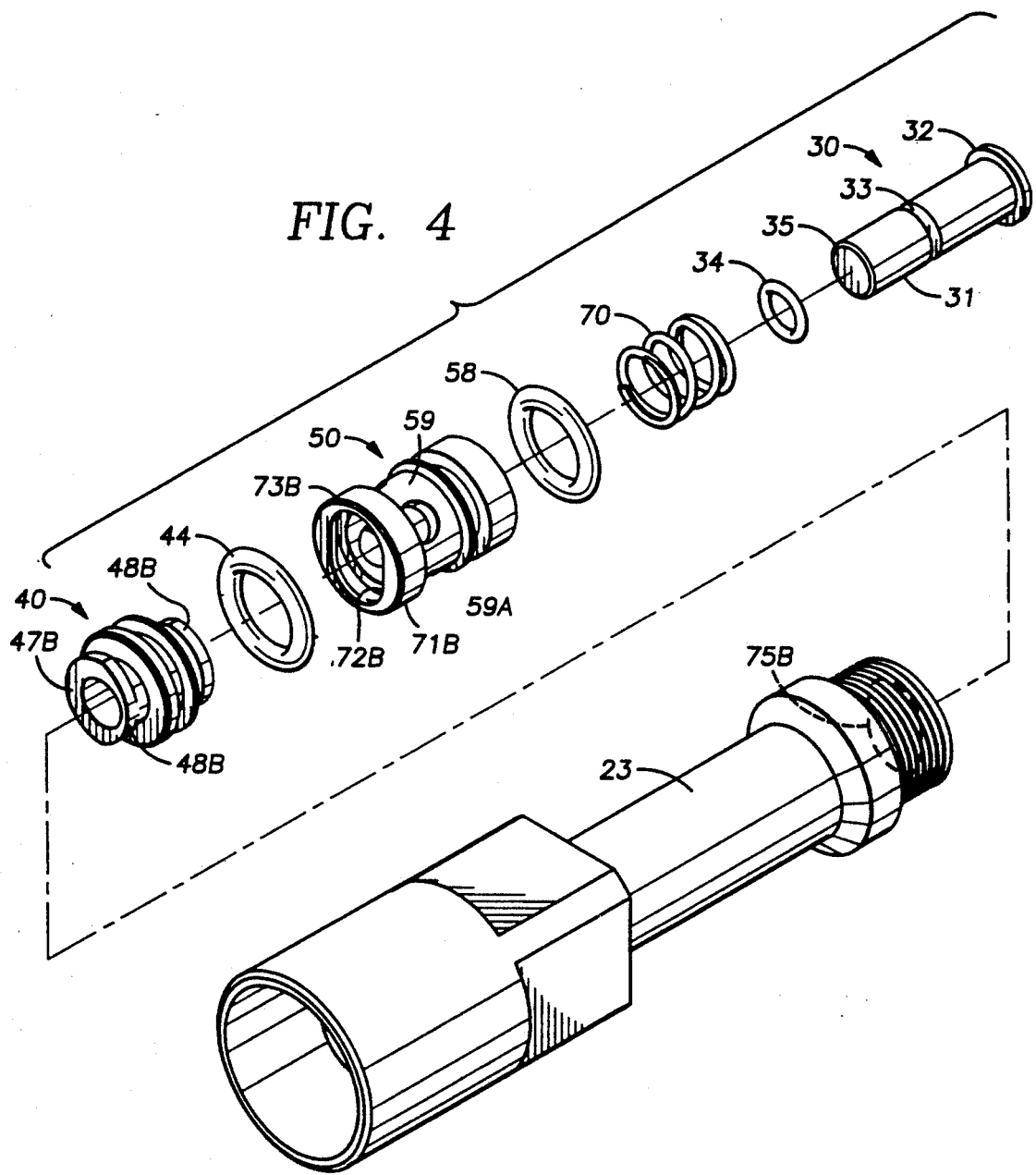
FIG. 4 is an exploded perspective of a second embodiment of the valve mechanism, with associated dump tube.
Figure 5:
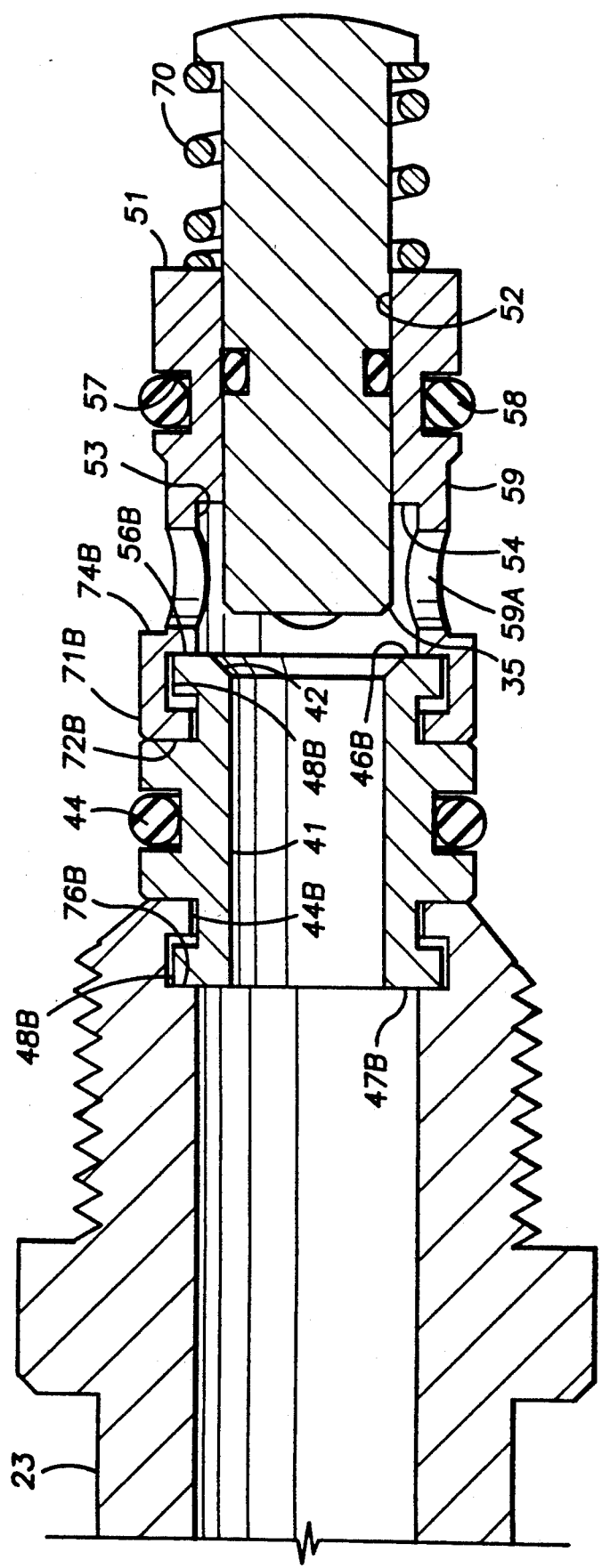
FIG. 5 is an axial section through the assembled parts shown in FIG. 4.
Figure 6:
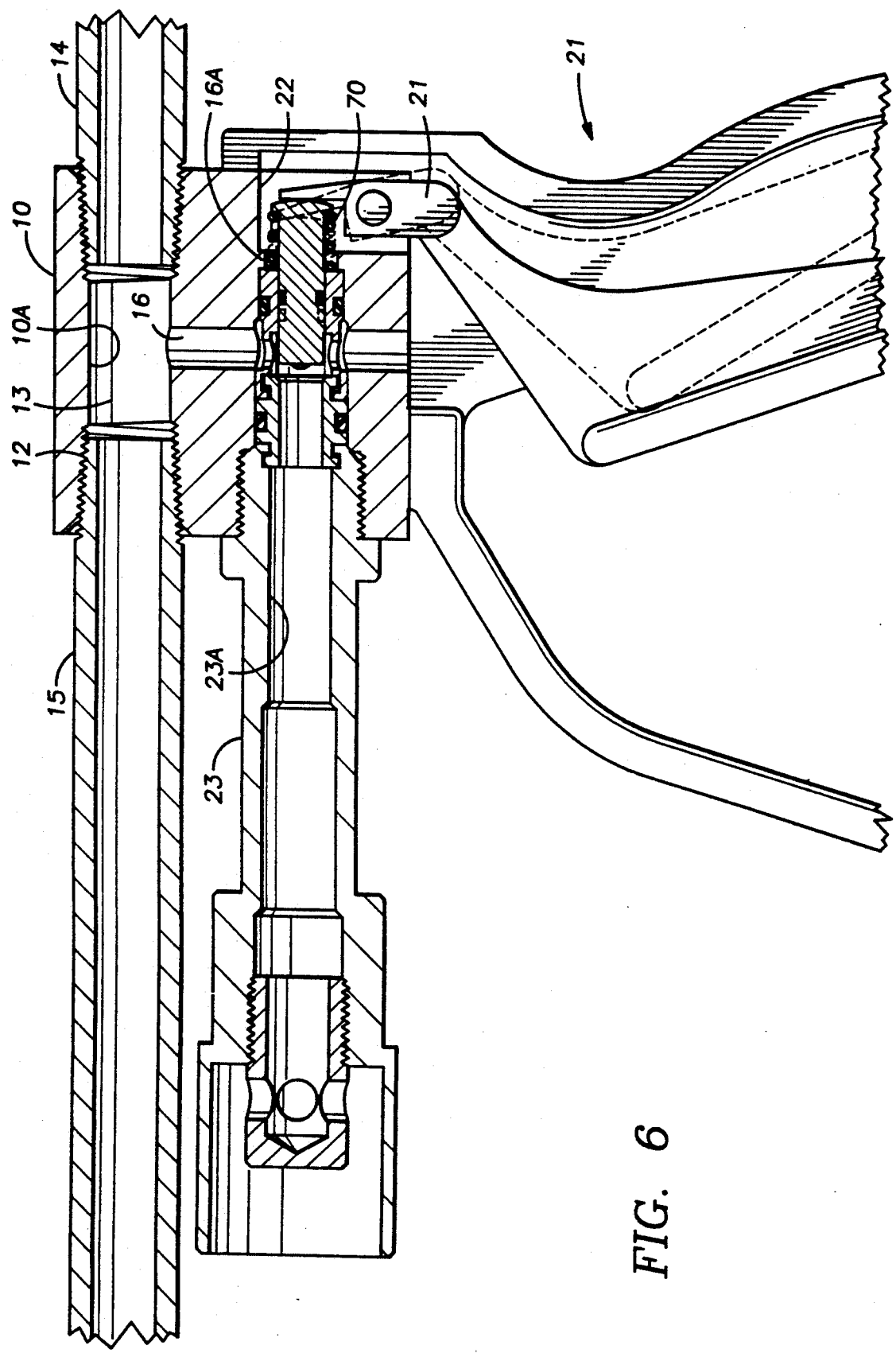
FIG. 6 is a partial vertical section of the assembled gun and valve mechanism of FIG. 4, with the trigger, when not activated being shown in solid lines, and with the trigger, when activated, being shown in phantom lines.

Look now at the embodiment of FIGS. 4, 5 and 6. The basic differences between the two embodiments comprise connections between the dump tube and seat and between the seat and guide. Difference in the part numbers will be shown by the use of the suffix "B" to like numbers in FIGS. 1–3. Where no physical differences exist, the numbers identifying the parts will not change, and the part description, other than the valve mechanism, will not generally be repeated.

The valve 30 of the second embodiment is not appreciably changed from that of the first embodiment.

Valve seat 40 includes a smooth axial bore 41, and at one end 46B, the wall of said bore has a beveled seating surface 42 at about 44° relative to its axis. The precise angles of surfaces 42 and 35 are not critical. What is important is that they differ so that an annular line seal occurs where they contact. Centrally of said seat, the outer wall includes annular seal recess 43 for receiving o-ring seal 44. Opposite ends 46B and 47B each includes a partial annular flange 48B forming a male fastener for releasable linkage to, respectively, flange 56B of valve guide 50 and lip 44B of dump tube 23, said dump tube performing as a positioning or fishing tool.

Valve guide 50 includes a smooth axial bore 52 from one end 51 to communicating, enlarged, axial counter bore 53. Said bore and counter bore are joined by shoulder 54. At this time note that the wall of said bore 52 is swept by valve seal 34 as it reciprocates therein. The other end of guide 50 includes annular flange 56B with depending annular skirt 71B and depending, inturned, annular lip 72B. Said lip 72B includes an elliptically shaped opening 73B therethrough, forming a female socket or fastener. Near guide end 51 is annular groove 57, which receives seal 58. Intermediate groove 57 and flange 56B, the outer wall of guide 50 is slightly dished or reduced in diameter, forming a skirt 59, one end forming an annular shoulder 74B. The wall of said skirt includes a plurality of apertures or fluid passageways 59A therethrough.

Dump tube 23 also includes a depending, annular lip 44B having an elliptically shaped opening 75B therethrough for releasably receiving partial annular flange or cam 48B, and having an internal shoulder 76B interior of said lip.

The fluid transmission operation of this embodiment is, for all practical purposes, like that of the first embodiment. End 47B of seat 40 has its flange 48B inserted, with a tilting and a twisting motion, within the dump tube opening 75B through lip 44B. The lever 21 of the trigger mechanism acting on the valve 30 dictates that the valve mechanism must be inserted into and removed from the gun housing from its front end, i.e., away from said trigger and, in this case downstream from fluid inlet 11. This in turn dictates that the seat end of the valve mechanism must e used to pull the said mechanism from the gun housing. Thus, the guide, seat, and dump tube are connected in series, but in such a way that they can be easily separated for field overhaul. This is accomplished by forming the partial flanges 48B at the opposed ends of seat 40. Such partial flanges perform as cams when inserted within the elliptical cutouts 75B and 73B of the dump tube lip 44B and guide skirt lip 72B, respectively. In each case, the cam or partial flange 48B is inclined, relative to the associated elliptical slot, inserted therein and latched under the lip, thus bringing the valve seat into axial alignment with the elliptically slotted component. Thereafter, as long as the two adjacent components remain axially aligned, they cannot separate, and may rotate freely, relative to each other. The gun housing bore retains the axial alignment. Withdrawal of the valve mechanism is accomplished in one basic operation. Unscrew the dump tue from the gun housing. This carries the seat, guide and valve along with the dump tube. After removal, tilt the seat relative to the dump tube and/or the guide so that cam (partial flange) 48B can be removed from the tube and/or guide opening or cutout 75B or 73B, respectively. End 46B of seat 40 has its flange 48B (both flanges 48B are substantially identical in shape and function) inserted, with the same twisting motion, into opening 73B of valve guide 50. Thus assembled, the valve mechanism, including spring, valve, valve guide and valve seat, can be inserted, valve head and spring first, through threaded bore end 19 of housing 10, until valve guide end 51 abuts shoulder 16A. At this time, the valve head, partial valve stem, and compression spring would extend through housing counter bore 17A into cutaway 22, where said head may be acted upon by trigger activating lever 21. Thereafter, fluid transmission would be like that previously described. In order to remove the valve mechanism, the dump tube is merely unscrewed and withdrawn, taking along the valve, valve guide and valve seat, all of which are releasably secured together.

Although only limited embodiments have been described, it should be obvious that numerous modifications would be possible by one skilled in the art without departing from the spirit of the invention, the scope of which is limited only by the following claims.

I claim:

1. A valve mechanism for controlling fluid flow in a pressurized fluid system, said mechanism including:

Valve member for sealing engagement with a valve seat, said valve member having a stem slidably received by a valve guide and movable between an open and a closed position;

a valve guide having a first passageway therethrough for slidably receiving said valve stem, and at least one further passageway communicating with said first passageway, female fastener means for releasably securing said guide to a valve seat, such securing means permitting relative rotation between said guide and seat but restricting relative axial movement; and cylindrical valve seat having an axial fluid passageway therethrough, an annular valve seating surface for sealing engagement with said valve member, and said valve seat including male fastener means for engagement with said female fastener means of said valve guide.

2. The mechanism of claim 1 wherein said male fastener means comprises a partial annular flange.

3. The mechanism of claim 2 wherein said female fastener means of said guide comprises a non-circular opening through one end of said guide.

4. In a high pressure fluid system having a housing with communicating high pressure inlet and outlet, a low pressure outlet and a valve mechanism for regulatably opening and closing communication between said high pressure inlet and said low pressure outlet, the improvement comprising:

a valve guide having first passageway means for receiving a valve member, further passageway means for communicating both with said first valve guide passageway means and with said high pressure inlet;

a valve member having a portion slidably received by said valve guide's first passageway means, and movable between an open and a closed position;

cylindrical valve seat having a fluid conduit therethrough, and an annular valve seating surface at one end of its said fluid conduit for sealing engagement with said valve member;

dump tube removably positionable in said low pressure outlet, for exhausting said fluid; and means for releasably securing said seat to both said guide and said dump tube, said securing means including means for permitting relative rotation between said seat and each of said guide and said dump tube but restricting relative axial movement therebetween, said securing means comprising male fastener means at opposite ends of said seat and female fastener means at the respective ends of said guide and said dump tube adjacent said seat.

5. The system of claim 4 wherein each of said male fastener means comprises a partial annular flange.

6. The system of claim 5 wherein each of said female fastener means comprises an elliptically configured opening.

7. A high pressure fluid system comprising:
housing member having;

a first passageway therethrough having high pressure fluid inlet means at its upstream end and high pressure fluid outlet means at the downstream end thereof, a second passageway therethrough having low pressure fluid outlet means at the downstream end thereof and valve activating means adjacent the upstream end thereof, further passageway means communicate with both said first and second passageways, dump tube means engageable with said low pressure fluid outlet means, valve mechanism positionable substantially within said second passageway, said valve mechanism comprising, a valve member having its head adjacent said valve activating means and a depending stem slidably received by valve guide means and movable between an open and a closed position, valve guide means having first conduit means for slidably receiving said valve stem, cylindrical valve seat having a fluid passageway therethrough with an annular valve seating surface at the upstream end of its said fluid passageway for sealing engagement with said valve member and said fluid passageway having a downstream end communicating with said low pressure fluid outlet, and connector means for inserting and removing said valve mechanism into and from said housing member's low pressure fluid outlet said connector means including means for releasably securing said seat to both said guide and said dump tube, said securing means including means for permitting relative rotation between said seat and each of said guide and said dump tube but restricting relative axial movement therebetween, said securing means comprising male fastener means at opposite ends of said seat and female fastener means at the respective ends of said guide and said dump tube adjacent said seat.

8. The system of claim 7, wherein said male fastener means comprises a partial annular flange.

9. The system of claim 8, wherein each of said female fastener means comprises an elliptically configured opening.

* * * * *